(12) United States Patent
Stitt

(10) Patent No.: US 6,510,311 B1
(45) Date of Patent: Jan. 21, 2003

(54) PHONE AMPLIFICATION AND PRIVACY DEVICE

(76) Inventor: Robert N. Stitt, P.O. Box 3129, Kailua-Kona, HI (US) 96740

( * ) Notice: Subject to any disclaimer, the term of this patent is extended or adjusted under 35 U.S.C. 154(b) by 0 days.

(21) Appl. No.: 09/350,430

(22) Filed: Jul. 8, 1999

(51) Int. Cl.[7] ................................................ H04Q 7/20
(52) U.S. Cl. ........................................ 455/90; 455/557
(58) Field of Search ............................ D14/136; 455/90, 455/575, 550, 66, 344, 346, 348, 556, 557; 379/428, 433, 434

(56) References Cited

U.S. PATENT DOCUMENTS

| | | | | |
|---|---|---|---|---|
| 4,490,576 A | * | 12/1984 | Bolante et al. | 174/65 SS |
| 4,905,270 A | * | 2/1990 | Ono | 455/569 |
| 5,175,759 A | * | 12/1992 | Metroka et al. | 455/569 |
| 5,794,164 A | * | 8/1998 | Beckert et al. | 455/456 |
| 5,881,150 A | * | 3/1999 | Persson | 379/433 |
| 5,898,758 A | * | 4/1999 | Rosenberg | 455/556 |
| 5,898,775 A | * | 4/1999 | Niemo et al. | 379/446 |
| 5,956,399 A | * | 9/1999 | Whitley et al. | 379/446 |
| 6,014,573 A | * | 1/2000 | Lehtonen et al. | 455/569 |
| 6,085,078 A | * | 7/2000 | Stamegna | 455/345 |
| 6,088,240 A | * | 7/2000 | Steinhoff et al. | 455/90 |
| 6,137,883 A | * | 10/2000 | Kaschke et al. | 379/433 |

* cited by examiner

*Primary Examiner*—Dwayne Bost
*Assistant Examiner*—Jean A Gelin
(74) *Attorney, Agent, or Firm*—Risto A. Rinne, Jr.

(57) ABSTRACT

Phone Amplification and privacy device with a U shaped cradle into which a cellular phone or public phone fits, a rectangular shaped housing that is hinged at one end to the bottom portion of the U shape, a speaker attached to the U shaped portion that ends up being located just over the top of and parallel to the microphone portion of the cellular phone or public phone, a microphone and amplifier circuit enclosed within the rectangular housing, an on/off switch and battery located within said rectangular housing, and a privacy shield hingably attached to one edge of the outside surface of said rectangular housing.

6 Claims, 3 Drawing Sheets

PHONE AMPLIFICATION AND PRIVACY DEVICE

BACKGROUND OF THE INVENTION

This invention relates generally to the field of telephone attachments, and more particularly to an attachable phone amplification and privacy device.

Cellular phones have been in existence for over ten years and phones located in public locations such as hotel lobbies and the like have been in existence for over fifty years. In particular, the use of cellular phones is becoming ubiquitous in public locations such as restaurants, airports and the like. It is common for a person to talk at normal or higher than normal volume while on a cell phone thereby making the contents of his or her conversation public to all those in the immediate area.

In recent times the size of cell phones has shrunk to the point where a persons mouth, while using a cell phone, is not in close proximity to the microphone portion of the cell phone causing the user to speak louder than normal while engaging in a phone conversation. The nature of many phone calls is private in and not meant to be broadcast to all those within a thirty foot radius of the user. Many cell phone users feel uncomfortable or embarrassed when speaking in a public environment. Conversely, many people in a public environment feel disturbed when a person nearby is carrying on a loud yet private conversation on a cell phone.

SUMMARY OF THE INVENTION

The primary object of the invention is to provide a better way to speak privately on a telephone while in a populated location.

Another object of the invention is to provide a device that can be easily added to and removed from a cellular phone or public phone.

Another object of the invention is to provide a privacy shield that prohibits people in the vicinity from seeing the mouth movement of the user.

Other objects and advantages of the present invention will become apparent from the following descriptions, taken in connection with the accompanying drawings, wherein, by way of illustration and example, an embodiment of the present invention is disclosed.

Phone Amplification and privacy device comprising: a U shaped cradle into which a cellular phone or public phone fits, a rectangular shaped housing that is hinged at one end to the bottom portion of said U shaped cradle, a speaker attached to the U shaped portion that ends up being located just over the top and parallel to the microphone portion of said cellular phone or public phone, a microphone and amplifier circuit enclosed within said rectangular housing, an on/off switch and battery located within said rectangular housing, and a privacy shield hingably attached to one edge of the outside surface of said rectangular housing.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
FIG. 1 is a perspective view of a person using a common cellular phone.
Figure 2:
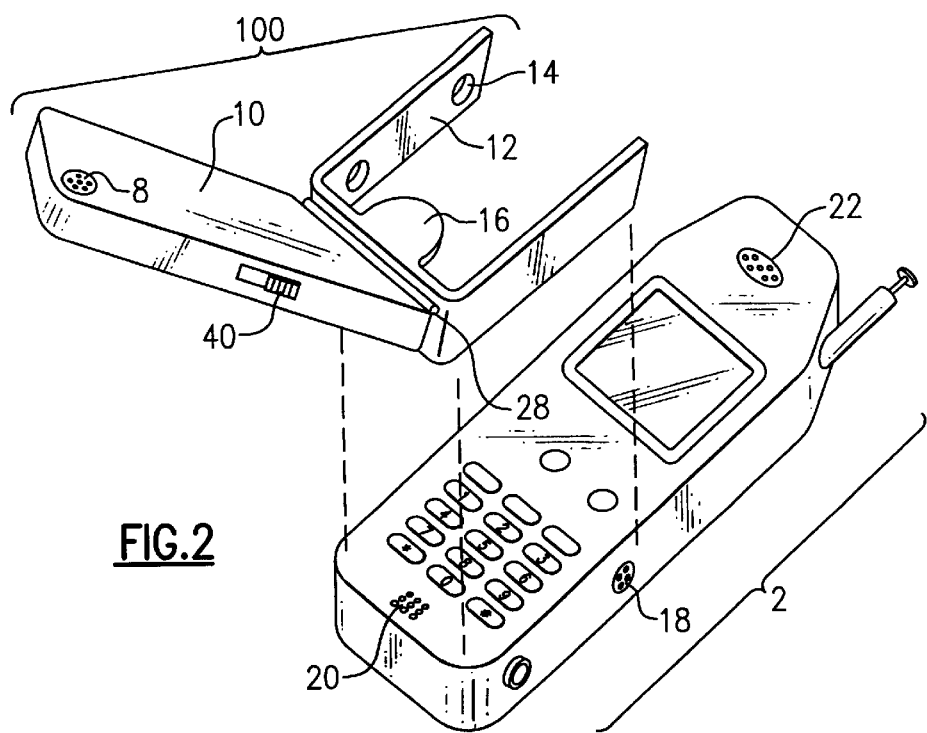
FIG. 2 is a perspective view of the phone amplification and privacy device about to be attached to a common cellular phone.
Figure 3:
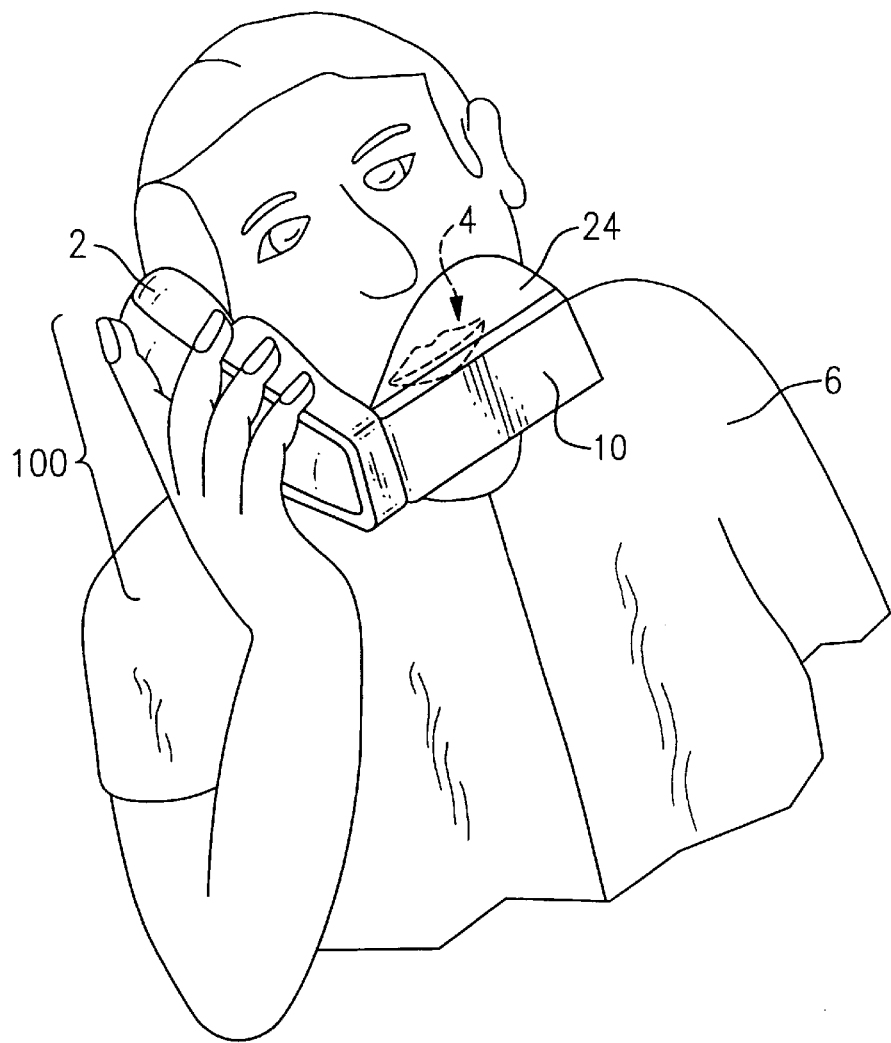
FIG. 3 is a perspective view of a person using a cellular phone with the current invention attached.
Figure 4:
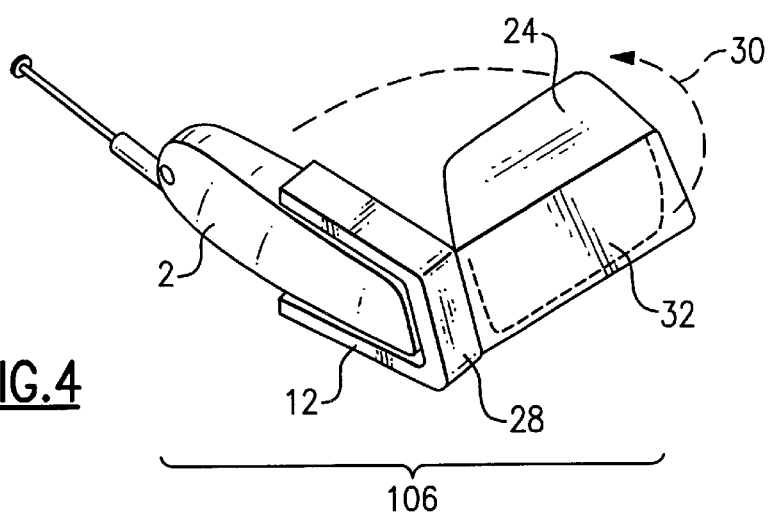
FIG. 4 is a perspective view of the present invention with the privacy shield folded out.
Figure 5:
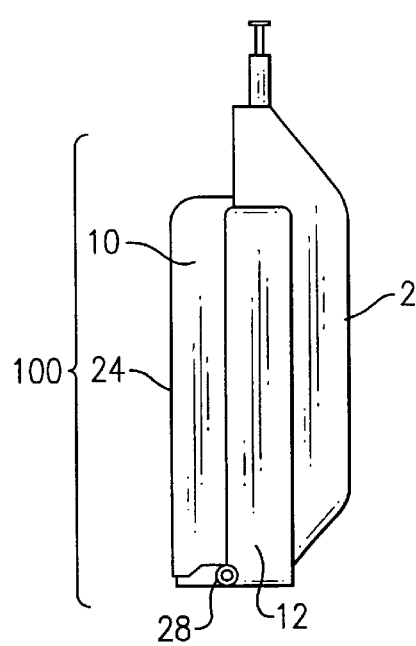
FIG. 5 is a side view of the present invention in the closed position.
Figure 6:
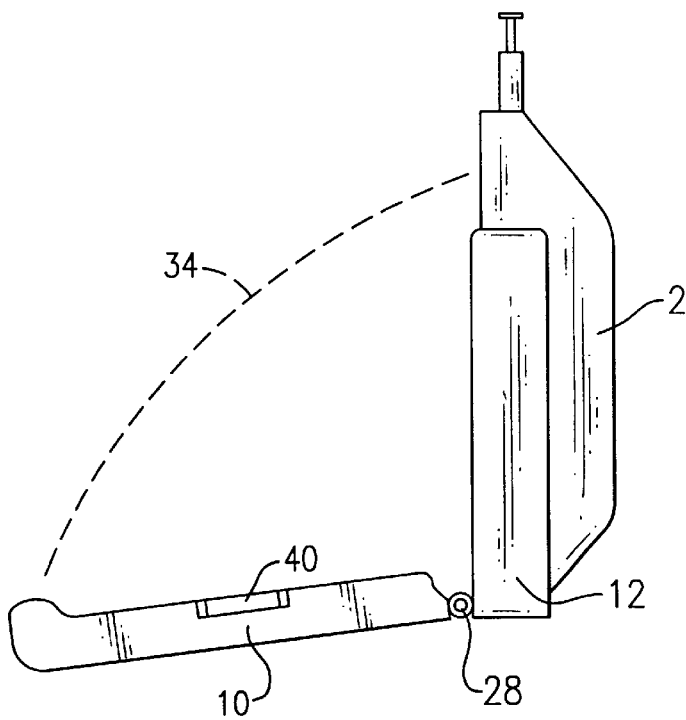
FIG. 6 is a side view of the present invention in the open position.
Figure 7:
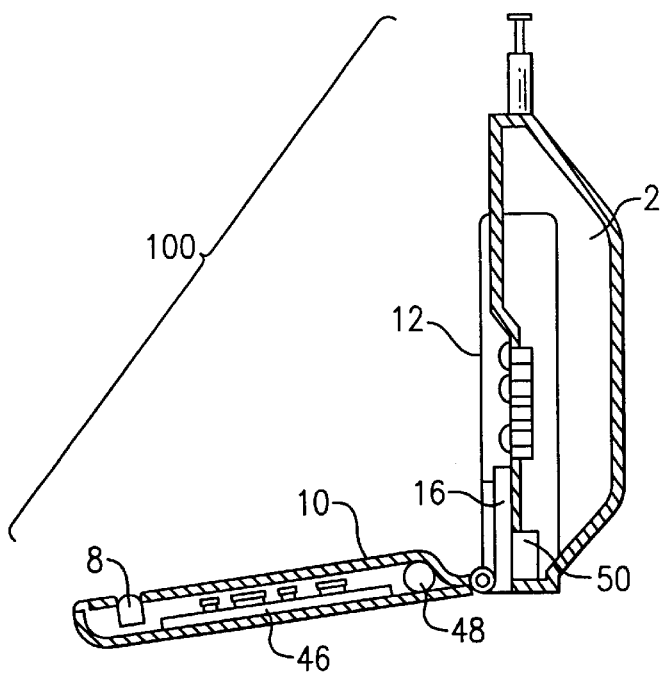
FIG. 7 is a side section view of the present invention.

Referring now to FIG. 1 we see a person 6 holding a common cellular phone 2 while conducting a conversation. Notice that the users mouth 4 is not in close proximity to the microphone portion of the cellular phone and that the mouth 4 is in plain sight thereby allowing nearby persons to see and hear the persons 6 private phone conversation. FIG. 2 shows a perspective view of the present invention 100 as it is about to be attached to a common cellular phone 2. The device 100 is made of rigid molded plastic. The U shaped cradle 12 fits around most common cellular phones 2 as well as fitting around the perimeter of a the mouth piece of a standard public phone. U shaped cradle 12 can be removably held in place by hook and loop type fasteners 14, 18 or other known fastening devices. The present invention 100 can also be used in conjunction with the hand piece of a public phone however in that condition the user 6 would simply hold the U shaped cradle onto the mouthpiece portion of the phone without benefit of fastening devices. On/off switch 40 turns on an amplifier circuit located within housing 10. A small speaker is located at point 16 and is facing downward so that when the present invention 100 is in place on phone 2 the speaker 16 is parallel to an just on top of the microphone portion 20 of the cell phone 2. Housing 10 is attached to U shaped cradle 12 at hinge point 28. Microphone 8 is located at the opposite end of housing 10. Speaker area 22 is located in its normal position on cell phone 2. FIG. 3 shows a perspective view of a person 6 using a cell phone 2 with the current invention 100 in place. In this configuration the user 6 can speak more directly into the microphone 8 located in the housing 10 of the present invention. A privacy shield 24 is folded into the use position thereby concealing the mouth of the user. An amplifier is built into housing 10 so that the user 6 can speak very softly into microphone 8 and the listener on the other end of the phone line will be able to hear the person 6 clearly. In this way, the user 6 can have a private conversation while in a public location and not have the people in the nearby vicinity be able to listen to the conversation. The privacy shield 24 further prohibits nearby people from listening in on the call because people can not see the mouth movements and facial expressions of the user 6. Furthermore, people in the nearby vicinity of the user 6 are spared the annoyance of having to listen to another persons phone conversation. FIG. 4 shows the present invention 100 and shows how the privacy shield 24 flips up 30 from its storage position 32 to its use position and shown. FIG. 5 shows a side view of the present invention 100 in its closed position while attached to a cell phone 2. The overall design only adds about a quarter of an inch to the width of the cell phone 2 thereby making it easy to carry along with the cell phone 2. FIG. 6 shows the present invention 100 is the open position as evidenced by arc 34. On/off switch 12 can include a potentiometer function so that the user can adjust the volume of the amplifier circuit located inside housing 10. FIG. 7 is a side section view of the present invention 100. Microphone 8 can be seen at the far end of housing 10. Amplifier 46 fits within housing 10 as does battery 48 which powers the amplifier circuit 46 and attached speaker 16. Speaker 16 resides directly over microphone 50 located within cell phone 2.

In the above described and illustrated way, a person can carry on a phone conversation on a cell phone or public phone and be able to speak softly so that others in the nearby vicinity can not easily hear the conversation. Additionally the privacy shield of the present invention prohibits others from reading the users lip movements. The end result is privacy for the user and the elimination of extraneous unwanted conversation to those in the vicinity of the cell phone user.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A phone amplification and privacy device, comprising:
   (a) a U-shaped cradle into which a cellular phone or public phone fits;
   (b) a rectangular shaped housing that is hinged at one end to the bottom portion of said U-shaped cradle;
   (c) a speaker attached to the U-shaped cradle that is disposed at the top of and parallel with respect to the microphone portion of said cellular phone or public phone;
   (d) a microphone and amplifier circuit enclosed within said rectangular housing wherein said microphone and amplifier circuit is adapted to receive and to amplify a human voice so as to produce an amplified human voice and to output said amplified human voice through said speaker sufficient to permit detection of said amplified human voice by said microphone portion of said cellular phone or public phone;
   (e) an on/off switch and battery located within said rectangular housing; and
   (f) a privacy shield hingably attached to one edge of the outside surface of said rectangular housing.

2. A phone amplification and privacy device, comprising:
   (a) a U-shaped cradle into which a cellular phone or public phone fits;
   (b) a rectangular shaped housing that is hinged at one end to the bottom portion of said U-shaped cradle;
   (c) a speaker attached to the U-shaped cradle that is disposed at the top of and parallel with respect to the microphone portion of said cellular phone or public phone;
   (d) a microphone and amplifier circuit enclosed within said rectangular housing wherein said microphone and amplifier circuit is adapted to receive and to amplify a human voice so as to produce an amplified human voice and to output said amplified human voice through said speaker sufficient to permit detection of said amplified human voice by said microphone portion of said cellular phone or public phone;
   (e) an on/off switch and means adapted for connecting a battery located within said rectangular housing; and
   (f) a privacy shield hingably attached to one edge of the outside surface of said rectangular housing.

3. A phone amplification and privacy device, comprising:
   (a) base means, said base means adapted to detachably receive a cellular phone;
   (b) means for amplifying a live spoken human voice sufficient to produce an amplified human voice included with said base means, and
   (c) a speaker adapted to output said amplified human voice, said speaker attached to said base means and adapted to be disposed proximate a microphone input of said cellular phone.

4. The phone amplification and privacy device of claim 3 wherein said base means includes means for providing a privacy shield.

5. The phone amplification and privacy device of claim 4 wherein said privacy shield is hingably attached to one edge of an outside surface of said base means.

6. The phone amplification and privacy device of claim 3 wherein said speaker is disposed adjacent to said microphone input of said cellular phone.

* * * * *